May 2, 1944. R. H. CRIPPS 2,348,175
TORQUE TESTER
Filed March 24, 1941

Ray H. Cripps
INVENTOR.

BY *[signature]*
ATTORNEY.

Patented May 2, 1944

2,348,175

UNITED STATES PATENT OFFICE 2,348,175

TORQUE TESTER

Ray H. Cripps, South Gate, Calif., assignor to Sawyer Electrical Mfg. Company, Los Angeles, Calif., a corporation of California Application March 24, 1941, Serial No. 384,911

14 Claims. (Cl. 265—24)

This invention relates to a device for determining the torque output of motors.

An object of the invention is to provide an improved device for determining the torque of high cycle induction motors in which the speed of the motor is varied by changing the frequency of its power supply.

Another object of the invention is to provide a device suitable for the determination of small torques at high speeds of rotation.

Figure 1:
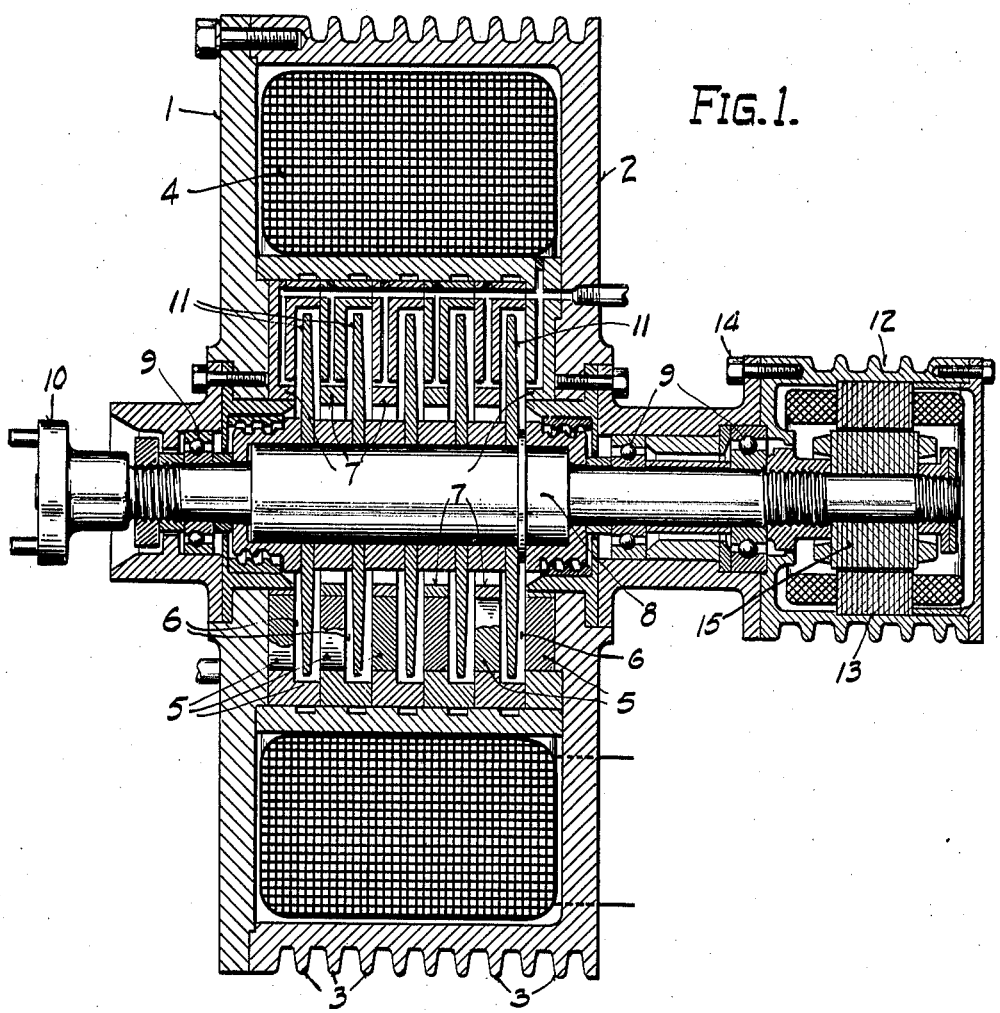
Figure 2:
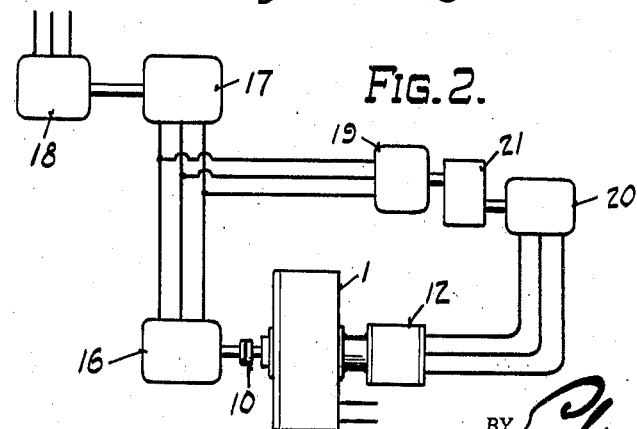

These and other objects of the invention will be clear from the following detailed description and the accompanying drawing in which:

Figure 1 is a sectional view through an eddy current dynamometer suitable for use in this invention; and Fig. 2 is a diagrammatic representation of the different parts of the equipment showing the electrical connections.

The invention is particularly adapted for testing the torque output of variable speed induction motors in which the speed is varied by changing the frequency of the current supply, the speed increasing as the frequency increases since speed is roughly proportional to frequency. Different types of dynamometers can be used to measure the torque such as eddy current, fluid friction, or solid friction dynamometers of different construction. For the purpose of illustration an eddy current dynamometer is shown since this is a simple and highly suitable type, but it is to be understood that other types can be used as well.

Referring to the drawing, and at first to Figure 1, the eddy current dynamometer 1 has a magnetic outer shell or casing 2 with ribs 3 for the dissipation of heat. A field coil 4 produces a magnetic field which passes through the outer shell and then longitudinally of its axis through magnetic inserts 5 and the gaps 6 between them. The magnetic inserts are supported by non-magnetic spacers 7 of brass or other suitable material.

A shaft 8, rotatable within the shell in bearings 9, is provided with a coupling 10 for attachment to the motor which is to have its torque determined. The shaft is rigidly fastened to discs 11 which are free to revolve in gaps 6 when the shaft 8 is rotated. The discs may be of aluminum or other suitable conducting material. When the field coil 4 is excited to produce a magnetic field across the gaps, motion of the discs transverse to the field sets up eddy currents in the discs and a torque is exerted on the outer shell. The outer shell is supported on suitable supports and has a lever arm or other device for measuring the torque. These features are not shown in the drawing as they are well known to the art and form no part of this invention. The structure and operation of the dynamometer as described up to here are also such as are customary in dynamometers of this type.

To adapt a dynamometer for use in connection with this invention, a high frequency induction motor 12 is mounted with its stator 13 rigidly secured by bolts 14 to the outer shell of the dynamometer. The rotor 15 is mounted on shaft 8. The purpose of this auxiliary or booster motor will be explained hereinafter.

Assume for the moment that no current is supplied to the auxiliary induction motor 12 and that the dynamometer is used in the usual way to measure torque. The motor 16 for which the torque is to be determined is set up with its shaft engaging coupling 10. Current of a given frequency is supplied to the motor 16, the frequency determining its speed of rotation at zero slip. With constant supply frequency the torque can be varied by changing the excitation of field coil 4, and a series of measurements can be taken which will show, for a fixed frequency applied to the motor being tested, the relations between torque, slip speed, power output, and power input. The series can be repeated for as many different supply frequencies as are desired.

The minimum torque which can be measured at any speed of rotation corresponds to zero magnetic field in the eddy current dynamometer. This will be obtained with zero excitation of the field coil, or with just sufficient reverse current to neutralize any permanent magnetism. When this condition is satisfied, there will be no electromagnetic drag between the rotor of the dynamometer and the outer shell. Whatever torque is exerted on the outer shell will be due to friction of the bearings and to fluid friction of the air in gaps 6. At low speeds both will be small so that torques down to substantially zero can be measured by the dynamometer without alteration. But at high speeds of rotation of the dynamometer shaft, the minimum torque will be considerable since the fluid friction in the gaps increases rapidly with increased speeds, and, as a consequence, when used at high speeds the simple eddy current dynamometer is incapable of measuring torques below a certain minimum value which may be a large fraction of the full load torque of a high power motor, or which may even be more than the full load torque of a small motor.

This invention makes it possible to test high cycle induction motors at high speeds over the complete range from substantially zero to full load torque, including low horse power motors which at high speeds develop a full load torque less than the minimum torque for the dynamometer at zero magnetic field. A suitable arrangement is shown schematically in Fig. 2. The motor 16 being tested is supplied with variable frequency current from alternator 17 driven by a motor 18 or any other suitable source of power which can be varied in speed so as to change the frequency of the alternator and hence the speed of motor 16. The motor is coupled to the dynamometer through coupling 10.

A suitable frequency changer may consist of an induction motor 19 driving an alternator 20. The induction motor 19 of the frequency changer is supplied with current of the same frequency as that supplied to the motor 16 under test, and will run at approximately the same speed if the two motors have the same number of poles, or at a rational multiple or sub-multiple of this speed if they have a different number of poles. The alternator or generator 20 of the frequency changer is driven by motor 19 through a variable speed drive 21 which may be of any suitable type. By varying the ratio of variable speed transmission 21, the current from generator 20 can be made to have the same, a greater, or a lesser frequency than the current from generator 17, or the same, a greater, or lesser frequency than a rational multiple or sub-multiple of the frequency. In either case, there will be, for a fixed ratio of the variable speed transmission 21, a substantially constant ratio between the frequencies produced by generators 17 and 20, any increase or decrease in the frequency from generator 17 causing an increase or decrease in the speed of motor 19 and a corresponding change in the frequency put out by generator 20. In other words, one frequency is approximately proportional to the other with only slight departures from exact proportionality due to small changes in the slip of motor 19 as the load upon its generator is changed. The ratio between the frequencies of the two generators is varied by changing the ratio of the variable speed transmission 21. The current from generator 20 is supplied to motor 12 mounted on the dynamometer.

Assume, for the purpose of illustration, that it is desired to test a motor at 12,000 R. P. M. and that at this speed a particular dynamometer absorbs 10 H. P. when no current is supplied to motor 12 and the field coil 4 is not excited. This speed and horse power consumption correspond to a torque of 263 pound feet. Hence, this particular dynamometer, if employed without modification, could not be used at 12,000 R. P. M. to test a motor of less than 10 H. P. since such a motor cannot develop sufficient torque to swing the rotor of the dynamometer up to 12,000 R. P. M. It could be used at 12,000 R. P. M. to test more powerful motors, but only for outputs in excess of 10 H. P. or torques greater than 263 pound feet.

Use is made of the auxiliary motor 12 to extend the range of the dynamometer and permit its use for lower torques and powers. Current is supplied to motor 12 from generator 20 to turn shaft 8 in the same direction that it is being turned by motor 16 under test. The ratio of variable speed transmission 21 is adjusted so as to increase the frequency of generator 20 enough to make the synchronous speed of auxiliary motor 12 greater than the synchronous speed of motor 16 undergoing test. This increase in the frequency supplied to motor 12 increases its slip and causes it to pick up a part of the load that would otherwise be carried by motor 16. A sufficient increase in frequency of the power supply to motor 12 will reduce the torque on motor 16 to zero, and even reverse its direction when the speed of motor 12 exceeds the no load speed of motor 16. Consequently, the motor 16 can now be tested at 12,000 R. P. M. down to zero torque and zero horse power output instead of, as before, down to a minimum torque of 263 pound feet and a minimum power output of 10 H. P. This assumes, of course, that the motor 12 is of at least 10 H. P. In general, in order that torques down to zero can be tested at all speeds of rotation, the motor 12 should be of sufficient power to spin the moving element of the dynamometer at the highest speed desired when the dynamometer is set to give its minimum possible torque for this speed. For eddy current dynamometers, this will correspond to zero magnetic field and vanishing electromagnetic drag.

It is to be noted that the torque produced by motor 12 is entirely internal to the dynamometer structure and consequently has no effect upon the torque registered by the lever arm attached to the outer shell of the dynamometer. This shows only the external torque exerted upon the dynamometer by motor 16. It is, therefore, entirely unnecessary to know the value of the torque exerted by motor 12, since it does not enter into the determination of the torque exerted by the motor under test. It is only necessary that the torque exerted by motor 12 be sufficient in magnitude to reduce the external torque to the desired value.

The arrangement shown is highly advantageous in the testing of high cycle induction motors at various speeds. If the frequency changer is set for a test at 12,000 R. P. M. and the speed of motor or prime mover 18 is changed to increase the frequency of alternator 17 so as to drive motor 16 at 14,000 R. P. M., the motor 19 of the frequency changer, being also connected to the alternator 17, will automatically increase the speed and cause generator 20 to supply a correspondingly higher frequency to motor 12. Due to this automatic correlation between the frequencies supplied to motors 16 and 12, one setting of the ratio on variable speed transmission 21 will suffice for testing motor 16 over a considerable range of speed.

While for simplicity I have described one type of frequency changer, I may employ other types. In place of the auxiliary frequency changer 19 I have employed a frequency changer of the wound rotor induction type driven by a multi-speed motor capable of running at selected constant R. P. M. In this case the primary of the frequency changer was excited from the same source of alternating current which supplies motor 16, and the modified frequency from the secondary was applied to motor 12.

I claim:

1. A device for measuring the torque of induction motors in which the speed is varied by changing the frequency of the current supply, comprising a source of alternating current to drive the motor undergoing test, means for varying the frequency of the current to control the speed of the motor, a dynamometer to measure the torque of the motor, an auxiliary induction motor with a stator secured to the shell of the dynamometer and a rotor secured to its shaft, and a frequency changer which is supplied with current from the source of alternating current and which supplies to the auxiliary induction motor current of a frequency to make its no load speed gerater than the no load speed of the motor under test.

2. A device for measuring the torque of induction motors in which the speed is varied by changing the frequency of the current supply comprising a source of alternating current to drive the motor undergoing test, means for varying the frequency of the current to control the speed of the motor, an eddy current dynamometer to measure the torque of the motor, an auxiliary induction motor with a stator secured to the shell of the dynamometer and a rotor secured to its shaft, and a frequency changer which is supplied with current from the source of alternating current and which supplies to the auxiliary induction motor current of a frequency to make its no load speed greater than the no load speed of the motor under test.

3. In a device for measuring the torque of electric motors in which the speed is varied by changing the frequency of the power supply, a dynamometer, an auxiliary motor to exert an internal torque between the stationary and the moving elements of the dynamometer in order to reduce the external torque required to turn the moving element, said auxiliary motor being responsive in speed to the frequency of the current supplied to it, and one of said motors being capable of considerable slip, means to supply alternating current to the motor under test, and means to supply alternating current of a different frequency to the auxiliary motor to make its no load speed greater than the no load speed of the motor under test.

4. In a device for measuring the torque of electric motors in which the speed is varied by changing the frequency of the power supply, a dynamometer, an auxiliary motor to exert an internal torque between the stationary and the moving elements of the dynamometer in order to reduce the external torque required to turn the moving element, said auxiliary motor being responsive in speed to the frequency of the current supplied to it, and one of said motors being capable of considerable slip, means to supply alternating current to the motor under test, and means to vary the frequency of the alternating current supplied to the auxiliary motor relative to the frequency of the current supplied to the motor under test.

5. In a device for measuring the torque of electric motors in which the speed is varied by changing the frequency of the power supply, a dynamometer, an auxiliary motor to exert an internal torque between the stationary and the moving elements of the dynamometer in order to reduce the external torque required to turn the moving element, said auxiliary motor being responsive in speed to the frequency of the current supplied to it, and one of said motors being capable of considerable slip, means to supply alternating current to the motor under test, and means to supply alternating current of different frequencies to the auxiliary motor to make its no load speed for any given frequency of a fixed ratio relative to the no load speed of the motor under test.

6. In a device for measuring the torque of electric motors in which the speed is varied by changing the frequency of the power supply, a dynamometer, an auxiliary motor to exert an internal torque between the stationary and the moving elements of the dynamometer in order to reduce the external torque required to turn the moving element, said auxiliary motor being responsive in speed to the frequency of the current supplied to it, and one of said motors being capable of considerable slip, means to supply alternating current to the motor under test, and means to supply alternating current to the auxiliary motor of a frequency relative to that supplied to the motor under test to effect the carrying of a part of the load of said dynamometer by the auxiliary motor.

7. In a device for measuring the torque of induction motors in which the speed is varied by changing the frequency of the power supply, an eddy current dynamometer, an auxiliary induction motor to exert an internal torque between the stationary and the moving elements of the dynamometer in order to reduce the external torque required to turn the moving element, means to supply alternating current to the motor under test, and means to supply alternating current of a different frequency to the auxiliary induction motor to make its no load speed greater than the no load speed of the motor under test.

8. In a device for measuring the torque of induction motors in which the speed is varied by changing the frequency of the power supply, a dynamometer, an auxiliary induction motor to exert an internal torque between the stationary and the moving elements of the dynamometer in order to reduce the external torque required to turn the moving element, a source of alternating current to run the motor undergoing test, means to vary the frequency of the source to change the speed of the motor, and a frequency changer connected to said variable frequency source to supply the auxiliary induction motor with alternating current having a frequency which is approximately proportional to the frequency of the source and of such magnitude as to make the no load speed of the auxiliary motor greater than the no load speed of the motor under test.

9. In a device for measuring the torque of induction motors in which the speed is varied by changing the frequency of the power supply, an eddy current dynamometer, an auxiliary induction motor to exert an internal torque between the stationary and the moving elements of the dynamometer in order to reduce the external torque required to turn the moving element, a source of alternating current to run the motor undergoing test, means to vary the frequency of the source to change the speed of the motor, and a frequency changer connected to said variable frequency source to supply the auxiliary induction motor with alternating current having a frequency which is approximately proportional to the frequency of the source and of such magnitude as to make the no load speed of the auxiliary motor greater than the no load speed of the motor under test.

10. In a device for measuring torque, a dynamometer, an induction motor to exert an internal torque between the stationary and moving elements of the dynamometer in order to reduce the external torque required to maintain the moving element at a given speed of rotation, and means to vary the speed of the induction motor.

11. In a device for measuring torque, an eddy current dynamometer, an induction motor to exert an internal torque between the stationary and moving elements of the dynamometer in order to reduce the external torque required to maintain the moving element at a given speed of rotation, and means to vary the speed of the induction motor.

12. In a device for measuring torque, a dynamometer attached to measure the torque of a motor, an auxiliary motor for exerting a torque between the stationary and moving parts of the dynamometer to compensate for at least a part of the internal load of said dynamometer during the testing of a motor, and means to vary the torque output of said auxiliary motor substantially proportional to the torque output of the motor under test.

13. In a device for measuring torque, a dynamometer attached to measure the torque of an electric motor, an auxiliary electric motor exerting a torque between the stationary and moving parts of the dynamometer to compensate for at least a part of the internal load of said dynamometer during the testing of said first named motor, and means to vary the frequency of the electric current driving said auxiliary motor substantially in proportion to the frequency of the electric current driving the motor under test to give a substantially accurate dynamometer reading for said motor under test at different speeds therefor.

14. In a device for measuring torque, a dynamometer having a variable load depending upon speed of rotation, a booster motor having a predetermined variable output connected to drive the shaft of the dynamometer and compensating for the varying load of said dynamometer to obtain accurate torque readings at different speeds and for variable load conditions above a predetermined minimum, and means for varying the speed of said booster motor.

RAY H. CRIPPS.